United States Patent [19]

Combest

[11] 4,207,724
[45] Jun. 17, 1980

[54] METHOD OF MAKING PULSATION BAG

[75] Inventor: John F. Combest, Findlay, Ohio

[73] Assignee: R. L. Kuss and Company, Findlay, Ohio

[21] Appl. No.: 908,673

[22] Filed: May 23, 1978

[51] Int. Cl.² .............................................. B65B 31/02
[52] U.S. Cl. ......................................... 53/403; 53/471
[58] Field of Search ..................... 53/403, 467, 471; 141/110, 111

[56] References Cited

U.S. PATENT DOCUMENTS

| | | | |
|---|---|---|---|
| 2,019,422 | 10/1935 | Loehle | 141/111 X |
| 3,831,341 | 8/1974 | Gauntlett | 53/467 X |
| 3,914,000 | 10/1975 | Beckerman et al. | 53/403 X |
| 4,045,862 | 9/1977 | Evans | 53/467 X |

Primary Examiner—Travis S. McGehee
Attorney, Agent, or Firm—David D. Murray; Vincent L. Barker, Jr.

[57] ABSTRACT

A plastic pulsation bag for automobile gasoline filters and a method of making the same is disclosed. The bag comprises two opposing flexible membranes peripherally sealed together along their opposing sides. At least one of the opposing sides is recessed so that a pocket is formed by the sealed membranes for enclosing a gas which is preferably heavier than air. In a preferred method, a first step in forming the bag is to slopingly insert the membranes into an open-top chamber containing a body of gas, such that the recessed opposing sides pass obliquely through the upper surface of the gas and face away from the chamber. The membranes are then agitated within the chamber to release trapped air adjacent thereto, oriented in an opposing relationship, mounted upon opposing sealing dies, and then sealed together about their peripheries. Pulsation bags made in accordance with this invention are useful in preventing "water hammer" in certain large vehicle fuel systems.

5 Claims, 6 Drawing Figures

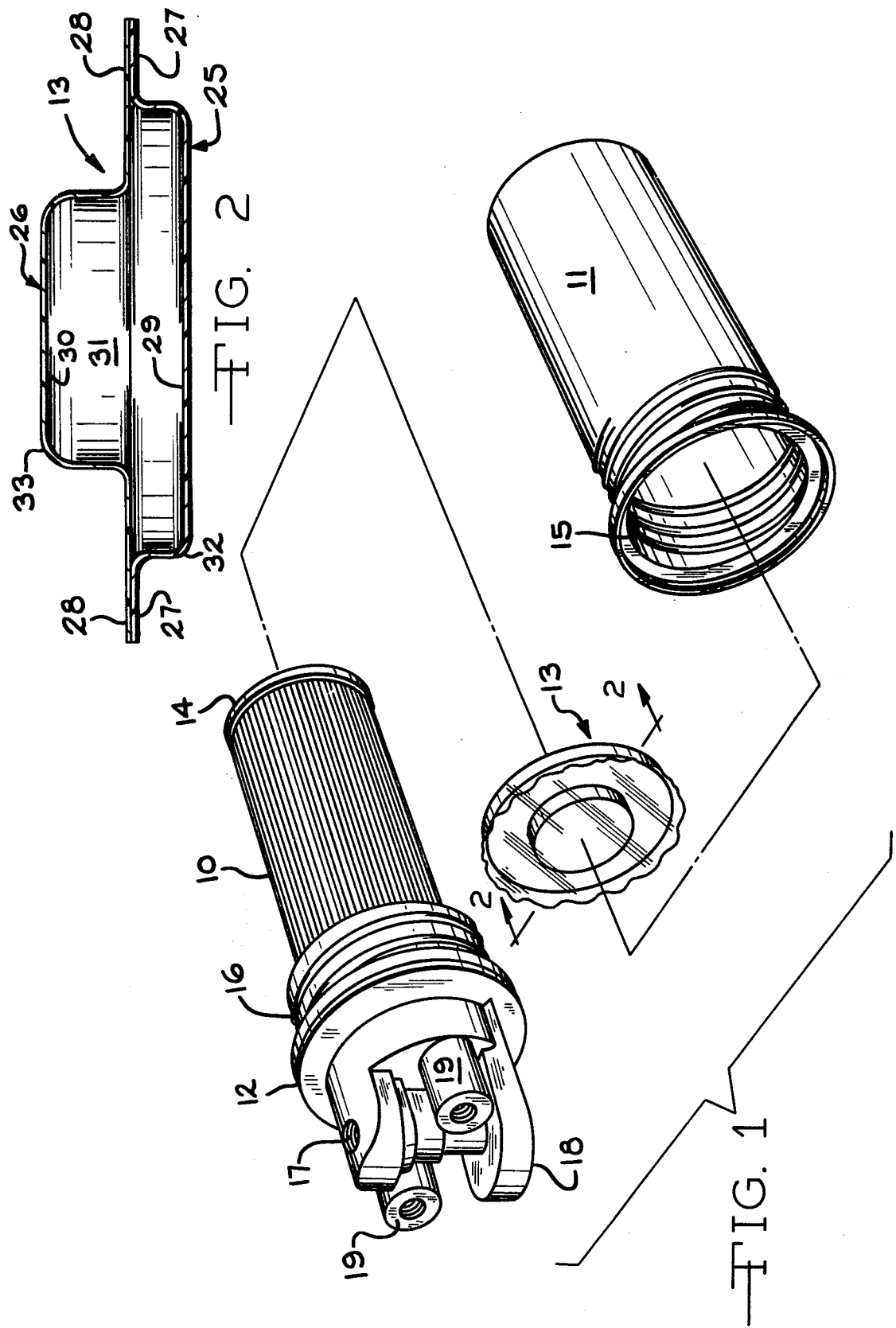

METHOD OF MAKING PULSATION BAG

BACKGROUND OF THE INVENTION

The present invention relates to pulse-absorbing bags for automobile gasoline filters and methods for making the same. Such bags and similar devices for preventing water hammer have been commonly used in the plumbing industry for years but, only recently, has a need for them been recognized in the automobile industry.

Collapsible plastic bags may be incorporated within the gasoline filter housings, or other appropriate in-line locations, of certain types of automobiles to absorb the pressure increase and shock created by sudden injections of gasoline which is non-compressible and cannot absorb such pressure fluctuations. In such a manner, the bags prevent the collapse of the filters themselves, and suppress the annoying "hammer" pulsations which would otherwise result. The "hammer" effect is especially noticeable with larger vehicles using big fuel pumps, and in particular those vehicles embodying a fuel injection system wherein the in-line pressure is generally cyclical.

To provide and maintain sufficient resiliency, the bags must be filled with a gas, and must be impermeable to both such gas and the fuel itself. Therefore, nylon is a preferred material because of its low permeability by gases, its flexibility, and its strength. However, since nylon is oxidizable and slightly permeable by air, air is an undesirous gas for enclosure within the bags and must be avoided. Thus, methods are needed to produce bags enclosing the preferred gas and eliminating air.

One prior art method for making such an article comprises nozzle injecting a positive pressure of the preferred gas between two parallel sheets of plastic; peripherally sealing the two sheets together and over the end of the nozzle by opposing primary dies, each die having a central concave surface for forming a pillow-shaped bag and opposing grooves on one side for positioning the nozzle; removing the nozzle after pressurizing the bag; and sealing the bag opening, which remains at the nozzle positioning grooves, by secondary dies immediately adjacent the primary dies. Such a method is obviously complicated and requires accurate timing between removing the nozzle and finally sealing.

SUMMARY OF THE INVENTION

The present invention is a simple method for manufacturing gas-containing pulse-absorbing bags which can be usefully employed within the gasoline filter housing of automobiles and other motor vehicles to prevent "hammer" pulsations therein. A first step of the method is to insert two flexible membranes, at least one of which is recessed on one side, into a gas-containing chamber and eliminate trapped air adjacent the membranes. The membranes are then oriented within the chamber in opposing relationship such that the recessed side or sides are immediately adjacent and opposing each other. Next, the membranes are peripherally sealed together along their opposing sides inside the chamber to encapsulate the gas within the formed bag.

Preferably, the gas is heavier than air so that a chamber having an open top may be used, thereby facilitating the containment of the gas and the elimination of air without providing elaborate closed atmosphere controls, etc., in the room where the bags are produced. One preferred gas, because of its density and its low permeability through most plastics, is monochlorotrifluoromethane.

Due to the recessed side on one or both of the membranes, and due to other surface irregularities, it is preferred that the membranes be slopingly inserted into the gas such that the recessed sides pass obliquely through the gas surface and face away from the chamber. It is also preferred that, once within the chamber, the membranes be agitated to further release any pockets of air captured adjacent thereto. Control valve means are also provided for automatically maintaining the gas level within the chamber.

It is, therefore, an object of the present invention to provide a means for sealing a non-air gas between two flexible membranes, at least one of which is recessed on one side.

It is also an object of the present invention to provide a method of manufacturing pulse-absorbing bags for incorporation within the gasoline filter housing or other inline locations of an automobile or the like.

The above-described objects and advantages are not considered limiting as others will be obvious to persons skilled in the art from the following detailed description of the present invention.

BRIEF DESCRIPTION OF THE DRAWINGS

FIG. 1 is an overall schematic view illustrating a pulse-absorbing bag and its relative location within a gasoline filter housing;

FIG. 2 is a sectional view along the line 2—2 of FIG. 1;

DETAILED DESCRIPTION OF THE DRAWINGS

Figure 3:
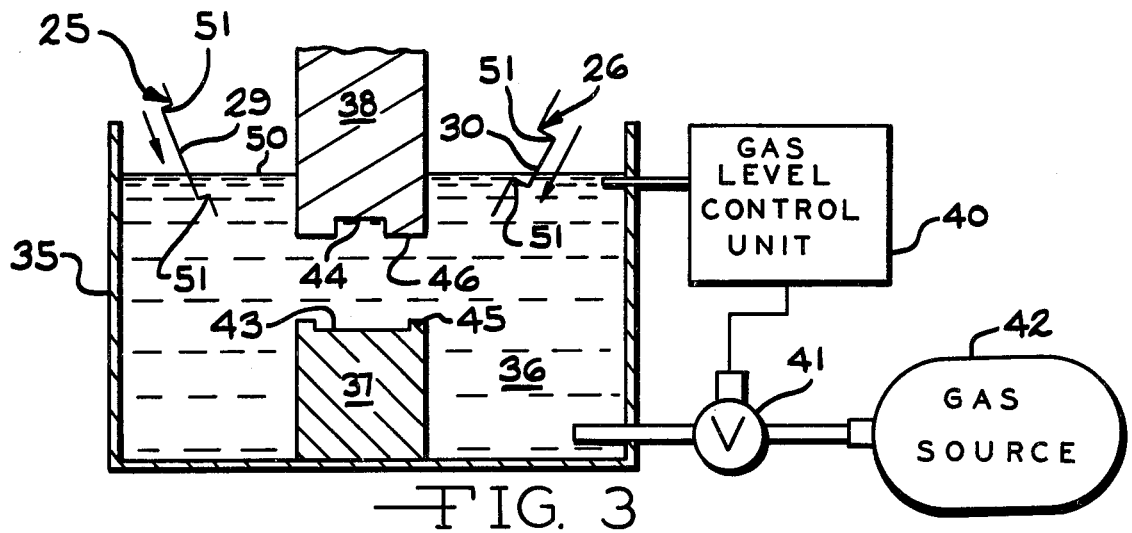
FIGS. 3–6 are sectional views of a gas chamber and sealing die, illustrating respectively the steps of inserting the flexible membranes into the gas chamber, agitating the membranes, mounting them in opposing relationship upon the dies, and peripherally sealing them together in accordance with a preferred method of the present invention.

FIG. 1 illustrates a gasoline filter 10, a filter housing 11, a housing support bracket 12, and a pulse-absorbing bag 13 for an automobile or other motor vehicle. As shown, the bag 13 is positioned immediately adjacent the bottom end 14 of the filter 10, and the housing 11 encloses both by engaging the housing threads 15 with the support bracket threads 16. Gasoline is fed from the fuel pump (not shown) through the inlet 17 in the bracket 12 into the housing 11 and around the filter 10. The in-line fuel pressure then forces the gasoline to penetrate the interior of the filter 10 and exit through the outlet 18. Mounting lugs 19, integral with the bracket 12, are provided for securing the filter housing 11 and bracket 12 to the vehicle frame.

The pulse-absorbing bag 13, shown in greater detail in FIG. 2, includes bottom and top membranes, 25 and 26 respectively, sealed together about their peripheries, 27 and 28. Both membranes, 25 and 26, are recessed on their opposing sides, 29 and 30, to form an internal cavity 31 for containing a gas. The recess 32 of the bottom membrane 25 conforms to the internal diameter of the housing 11, whereas the button-shaped recess 33 of the top membrane 26 corresponds with a concavity (not shown) in the bottom end 14 of the filter 10 for snug engagement therewith.

Although the shape of the pulse-absorbing bag 13 in FIG. 2 has been described in detail for purposes of this application, the method of the present invention, to be described below, is not limited to that particular shape, since others will be apparent to the artisan depending upon the use environment and other factors.

FIGS. 3–6 illustrate an open-top chamber 35 holding a body 36 of gas, opposing sealing dies, 37 and 38, within the chamber 35, the bottom and top membranes, 25 and 26, and means for maintaining the height of the body 36 of gas, including a gas level control unit 40, a valve 41, and a gas source 42. To provide and maintain sufficient resiliency, the membranes, 25 and 26, are made from flexible material and must be impermeable to the gas in the chamber 35. Therefore, many plastics are suitable, although nylon is especially preferred because of its low permeability and high strength. Since air is at least slightly permeable through most suitable plastics, and, in addition, since air oxidizes nylon, thereby rendering it brittle and subject to fracture, a non-air gas is required. A particular gas which has proved useful with nylon is monochlorotrifluoromethane. Not only is nylon impermeable by monochlorotrifluoromethane, but also monochlorotrifluoromethane is heavier than air, which facilitates containment of the gas and elimination of air, as will be obvious from the discussion of the method below. However, although a gas which is heavier than air is preferred, the method of the present invention could also be used with a gas which is lighter than air if certain obvious modifications, such as an open-bottom chamber instead of an open-top one, were made to the apparatus in the drawings.

The sealing dies, 37 and 38, include indentations, 43 and 44 respectively, on their opposing ends 45 and 46, which fit the shapes of the membranes, 25 and 26, and upon which the membranes, 25 and 26, may be seated for sealing purposes. The upper sealing die 38 is vertically movable and includes a heat rod, integral therewith but not shown, for the purpose of compressing and heat sealing the two membranes, 25 and 26, together between the dies, 37 and 38. Such dies are well-known throughout the industry and need not be described in any more detail here in order to understand the invention.

The gas level control unit 40 is not critical to the present invention and may be of the float-type, relative density type, or any other kind which is quite familiar in industry. The function of the unit 40 is to actuate the valve 41, when necessary, to fill the chamber 35 with gas from the source 42.

In accordance with a preferred method of the present invention, the membranes, 25 and 26, are slopingly inserted into into the gas such that the recessed sides, 29 and 30, pass obliquely through the gas surface 50 and face away from the chamber 35, as shown in FIG. 3. Facing the recessed sides, 29 and 30 away from the chamber 35 and slopingly inserting the membranes, 25 and 26, facilitates the elimination of most of the air adjacent thereto since the air is lighter than the gas and will remain above the gas surface 50.

Figure 4:
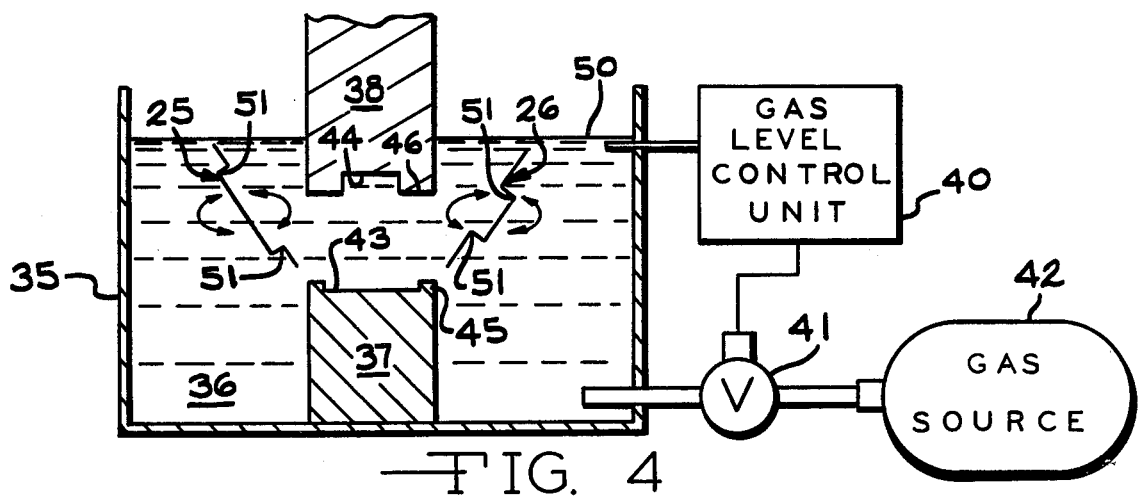

In some cases, pockets of air will remain trapped at corners, such as indicated by the numeral 51, around the membranes, 25 and 26. Thus, it is essential to agitate the membranes, 25 and 26, within the body of gas 36, as shown in FIG. 4. The loosened air floats to the gas surface 50 and is eliminated from the chamber 35.

Figure 5:
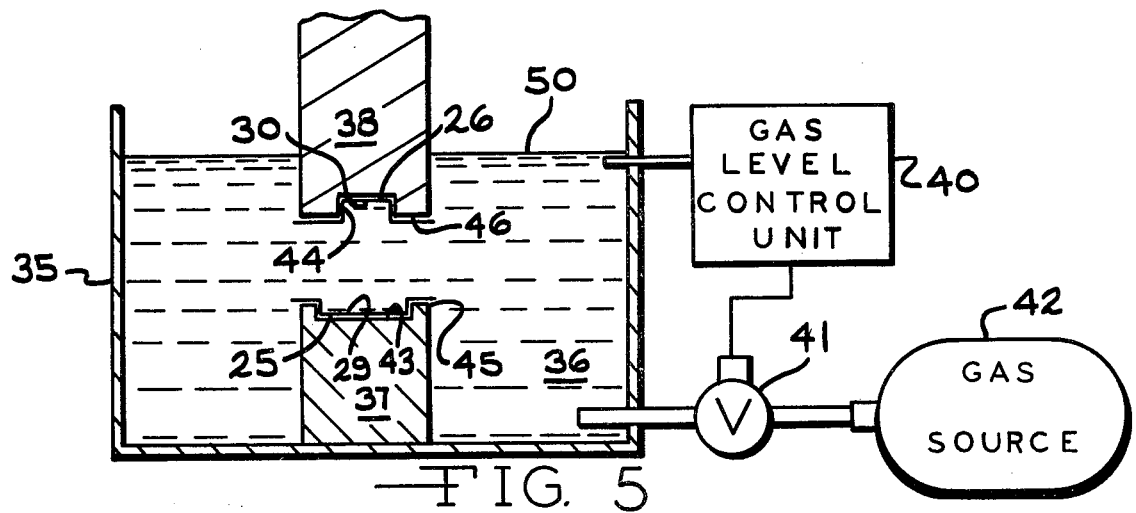
Figure 6:
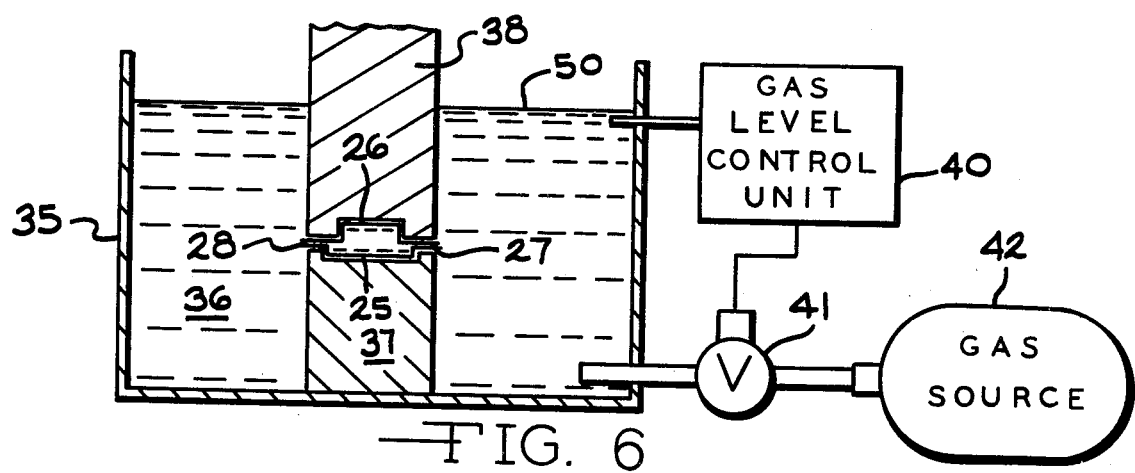

The membranes, 25 and 26, are then positioned within the identations, 43 and 44, at the ends, 45 and 46, of the dies, 37 and 38, as shown in FIG. 5. The upper die 38 presses (FIG. 6) the membranes, 25 and 26, together between the dies, 37 and 38, and heat seals the membranes, 25 and 26, around their peripheries, 27 and 28, to form the bag 13.

Although a preferred method of the present invention has been described above in detail, the method is not intended to be so limited since other modifications will be apparent to persons skilled in the art without departing from the scope of the invention as set forth in the claims.

What I claim is:

1. A method of manufacturing gas-containing plastic pulse bags comprising two opposing flexible membranes peripherally sealed along their opposing sides, at least one of which opposing sides is recessed and forms an internal pocket for enclosing a gas having a density greater than air, including the steps of providing a chamber continuously filled with such gas and having an open top, inserting said two plastic membranes into said open-top chamber, eliminating trapped air adjacent said membranes by agitating said membranes within said chamber such that air trapped adjacent said membranes is released, orienting said membranes in an opposing relationship, and peripherally sealing said membranes within said chamber to seal a quantity of said gas within said pocket.

2. A method, as defined in claim 1, wherein said sealing step includes peripherally fusing said opposing sides together by peripherally compressing and heating said membranes between two sealing dies.

3. A method, as defined in claim 1, further including the step of controlling the gas height within said chamber.

4. A method of manufacturing gas-containing plastic pulse bags comprising two opposing flexible membranes peripherally sealed along their opposing sides, at least one of which opposing sides is recessed and forms an internal pocket for enclosing a gas having a density greater than air, including the steps of providing a chamber continuously filled with such gas and having an open top, slopingly inserting said membranes into said chamber such that such recessed opposing sides pass obliquely through an upper surface of such gas and face away from said chamber, agitating said membranes within said chamber such that trapped air adjacent said membranes rises to the top of said chamber, orienting said membranes in an opposing relationship, peripherally fusing said opposing sides together by peripherally compressing and heating said membranes between two sealing dies to seal a quantity of said gas within said pocket, and controlling the gas height within said chamber.

5. A method of manufacturing gas-containing plastic pulse bags comprising two opposing flexible membranes peripherally sealed along their opposing sides, at least one of which opposing sides being recessed and forming an internal pocket for enclosing a gas having a density greater than air, including the steps of providing a chamber continuously filled with such gas and having an open top, eliminating trapped air adjacent said membranes by slopingly inserting said two plastic membranes into said chamber such that said recessed opposing sides pass obliquely through an upper surface of such gas and face away from said open-top chamber, orienting said membranes in an opposing relationship, and peripherally sealing said membranes within said open-top chamber to seal a quantity of said gas within said pocket.

* * * * *